April 27, 1948.  W. O. TAFF  2,440,620
CONTACTING SOLIDS AND GASEOUS FLUIDS
Filed Aug. 24, 1944
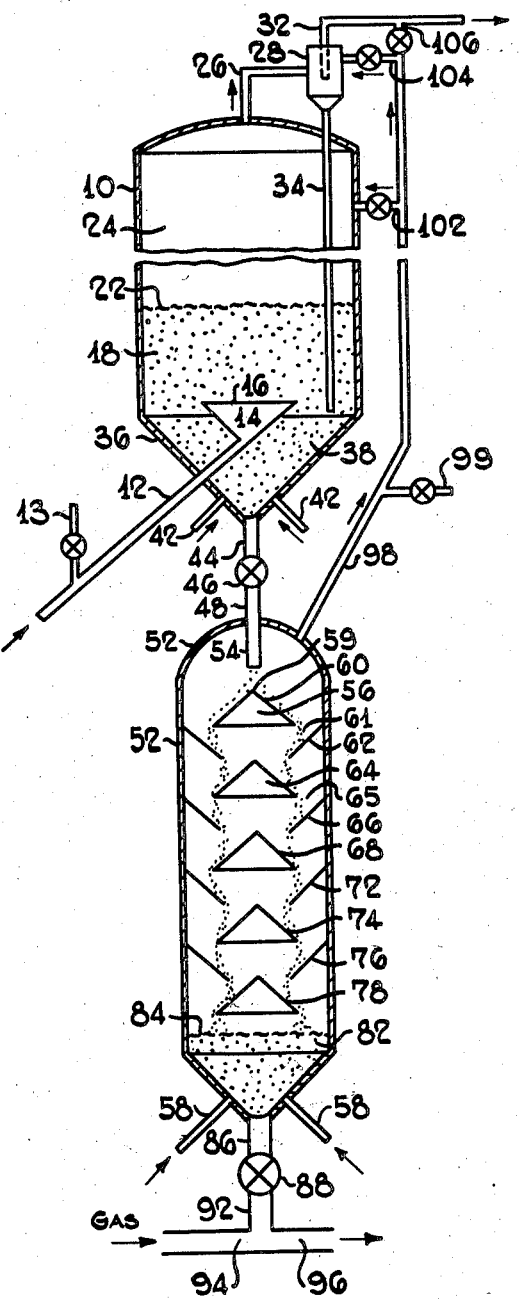
Wilfred O. Taff  Inventor
By  Attorney Patented Apr. 27, 1948

2,440,620

UNITED STATES PATENT OFFICE 2,440,620

CONTACTING SOLIDS AND GASEOUS FLUIDS

Wilfred O. Taff, Roselle, N. J., assignor to Standard Oil Development Company, a corporation of Delaware Application August 24, 1944, Serial No. 551,027

1 Claim. (Cl. 23—288)

This invention relates to contacting solid particles with gaseous fluids, and more particularly, relates to stripping or purging contact or catalyst particles following a reaction or contacting step.

In operations where solid particles are contacted with gaseous fluids, such as in chemical reactions, some volatile reactant material is entrained or adsorbed by the catalyst or contact particles when they are removed from the contacting zone. For example, in the catalytic conversion of hydrocarbons, such as the catalytic cracking of hydrocarbons to produce gasoline, coke or carbonaceous material is deposited on the catalyst or contact particles and the particles must be regenerated before being used over again in another contacting or cracking step. Before regeneration, it is usual practice to strip or purge the spent or contaminated catalyst particles to remove entrained hydrocarbon vapors and gases.

In the later designs of catalytic cracking units where spent catalyst or contact particles are withdrawn in a dense fluidized condition from the bottom portion of the reaction zone, stripping or purging has been incomplete, that is, the removal of entrained hydrocarbon vapors or gases from the spent or contaminated catalyst or contact particles has been incomplete. As a result, some of the strippable or volatile material has been burned in the regeneration zone both increasing the temperature of the regeneration zone beyond desired limits and burning part of the feed stock which could be recovered as hydrocarbons.

Also, in the later design, the stripping zone is annular and arranged directly beneath the reaction zone so that the catalyst particles in dense fluidized condition are passed directly from the reaction zone to the stripping zone. The stripping gas passing upwardly through the stripping zone passes up through the dense fluidized bed of catalytic material in the reaction zone. This limits the amount of hydrocarbon vapors to be reacted which are introduced into the reaction zone because the velocity of the upflowing vapors and gases is limited to maintain the catalyst or contact particles in a dense fluidized bed or mixture in the reaction zone.

According to my invention, the contact or catalyst particles in a relatively dense dry liquid-simulating condition are withdrawn from the bottom portion of the reaction zone or vessel and passed to the upper portion of a separate stripping section or vessel wherein the particles flow downwardly countercurrent to upflowing purging or stripping gas. The stripping gas and the vapors and gases removed by the stripping are passed from the upper portion of the separate stripping section or vessel to the upper portion of the reaction zone above the dense bed of fluidized catalyst or contact particles or into the inlet or outlet of the separating means associated with the reaction zone.

Or the stripping gas from the stripper may pass to a separate separator and the solids returned to the bottom of the stripper or admixed with solids going to the regenerator. As the stripping gas and stripped material do not pass through the fluidized bed of catalytic or contact material in the reaction zone, more vaporous reactive material may be passed through the reaction zone while maintaining the bed of catalytic material in a fluidized condition.

In the drawing, the figure represents one form of apparatus which may be used in carrying out my invention.

Referring now to the drawing, the reference character 10 designates a contacting or reaction vessel provided with an inlet 12 for introducing reactants and subdivided catalytic material. Catalytic material, such as hot regenerated catalyst, is introduced into line 12 through line 13. In the form of apparatus shown in the drawing, reactant material and subdivided solid catalytic or contact material are passed through the line 12 into the reaction vessel 10. In the catalytic cracking of hydrocarbons, the feed may be a vaporizable stock, such as light or heavy gas oil, gas oil, heavy naphtha, etc., or stock which contains normally unvaporizable constituents, such as crude oil or reduced crude petroleum oil. The hydrocarbon material may be vaporized before being mixed with the catalytic material or it may be partly preheated and only partly vaporized and then mixed with a sufficient amount of hot regenerated catalyst particles to vaporize the rest of the liquid hydrocarbons and raise them to the reaction temperature.

The mixture of reactants and catalytic material is introduced into the cone-shaped inlet member 14 arranged in the bottom portion of the reaction or contacting vessel 10. The upper portion of the conical inlet member 14 is provided with a perforated distribution plate 16 for evenly distributing the catalyst or contact particles and vaporous reactants across the area of the reaction vessel. The velocity of the vaporous reactants is selected and maintained between about 1.0 ft./second and 2.0 ft./second to produce a dense dry fluidized liquid-simulating mixture or bed 18 having a level indicated at 22.

When using a silica alumina catalyst for the catalytic conversion of hydrocarbons, such as acid-treated bentonite clays or synthetic silica alumina gels, and where the catalyst has a size between about 200 standard mesh and 10 microns, the dense fluidized mixture 18 has a density of about 13 lbs./cu. ft. to 25 lbs./cu. ft. When cracking hydrocarbons, the catalyst to oil ratio by weight may vary between about 5 to 1 and 35 to 1.

Above the dense fluidized mixture 18 is a dilute phase 24 in which only small amounts of catalyst are entrained in the vaporous reaction products. The vaporous reaction products pass overhead from the reaction vessel 10 through line 26 and are passed to a separating means 28 for separating most of the entrained particles from the vaporous reaction products. The separated vaporous reaction products leave the separating means 28 through line 32 and are passed to any suitable separating system, such as a fractionation system (not shown), for separating desired products.

The separating means 28 is shown in the drawing as a cyclone separator but other separating means may be used, such as a Multiclone separator, and further, if more than one separating means is desired, a series of cyclone separators may be used. While I have shown the separating means 28 located outside the reaction vessel 10, it is within the contemplation of my invention to place the separating means 28 inside the reaction vessel 10 in the upper portion thereof.

The separated solids collecting in the separating means 28 are returned to the dense fluidized mixture 18 in the reaction vessel 10 below the level 22 by return pipe or dip leg 34 which preferably extends below the level of the distribution plate 16. The bottom portion of the reaction vessel 10 is conical in shape as shown at 36 and constructed in such a manner as to minimize catalyst hold-up. The dense fluidized dry liquid-simulating mixture passes from the dense bed 18 into the conical portion 36 below the distribution plate 16.

In the catalytic conversion of hydrocarbons, coke or carbonaceous material is deposited on the catalyst particles and it is necessary to remove the coke or carbonaceous material as by burning with air before using the catalyst particles in another conversion step. The catalyst or contact particles as they leave the bottom portion of the reaction zone or vessel 10 entrain or adsorb hydrocarbon vapors or gases and before regenerating the particles, it is preferred practice to strip or purge the catalyst or contact particles to remove as much of the entrained vapors and gases as possible.

The spent or contaminated particles collecting in the conical bottom 36 as at 38 of the vessel 10 are maintained in a dry aerated or fluidized condition by the introduction of a fluidizing gas through lines 42. This aerating or fluidizing gas may be an inert gas, such as steam or flue gas, or may be a hydrocarbon gas, such as C₃ and lighter from the stabilization facilities. Only sufficient fluidizing gas is introduced to maintain the particles in a fluidized flowable condition and substantially no stripping is carried out in the bottom conical portion 36 of the vessel 10. The catalyst is moved through this section 36 as rapidly as possible in order to minimize the very severe cracking of adsorbed or entrained oil vapors in this section with the consequent production of non-strippable coke.

From the conical bottom 36 of the vessel 10 the fluidized catalyst or contact particles are flowed into a standpipe 44 provided at its lower end with a control valve 46 which is preferably a slide valve for controlling the rate of withdrawal of spent or contaminated catalyst or contact particles from the vessel 10. Fluidizing or aerating lines may be provided for standpipe 44. The particles are then passed through line 48 into the upper portion of a separate stripping section or vessel 52 arranged below the reaction vessel 10. It will be noted that the pipe or line 48 has an extension 54 which extends downwardly from the upper part of the stripping section or vessel 52.

The outlet of the line 54 is arranged above a baffle 56 which forms the disc and doughnut baffle construction arranged in the stripping section or vessel 52 which will be presently described. Stripping gas, such as steam, low molecular weight hydrocarbon gas, or inert gas, such as flue gas, is introduced into the bottom portion of the stripping vessel 52 through lines 58. The stripping gas, preferably steam, is passed upwardly through the stripping section 52 and strips volatile material from the solid particles as they pass downwardly over the disc and doughnut baffle construction in the stripping vessel 52. Additional stripping gas may be introduced into vessel 52 above the dense bed 84.

The disc 56 has a pointed top 59 and diverging sides 60 so that the solid particles as they pass from the outlet end of the pipe 54 are directed outwardly toward the wall of the stripping vessel 52. As they leave the bottom of the disc 56 they pass through space 61 arranged between the doughnut 62 and the disc 56 and at this place they are intimately mixed and agitated with the stripping gas passing upwardly through the vessel 52. The particles then are directed toward a lower disc 64 from which they are directed into the space 65 between the next lower doughnut 66 and at this point they are again mixed and agitated with the stripping gas. This action takes place at similar points throughout the stripping vessel 52.

Below the doughnut 66 is another disc 68 below which another doughnut 72 is arranged. Below doughnut 72 is another disc 74 below which another doughnut 76 is arranged. Below the doughnut 76 is another disc 78. While I have shown a certain number of discs and doughnuts, it is to be understood that the number is not fixed and any suitable number of these elements may be used. While I have shown a baffled stripping section which is the preferred form, it is to be understood that a cylindrical stripping vessel may be used without baffles. Instead of using discs and doughnuts, other baffle means, such as perforated plates or packing, may be used. With such baffling, it is only necessary to have a sufficient area to permit even downflow of the solid particles while permitting upflow of the gaseous stripping medium.

The solid particles in stripped condition are passed over the bottom disc 78 and are collected in the bottom of the stripping section of vessel 52 as a dense dry fluidized liquid-simulating mixture 82 having a level 84 below the disc 78. The stripping gas introduced through lines 58 into the bottom portion of the stripping vessel 52 functions to maintain the particles in fluidized condition in the bottom of the stripping vessel 52. In the above stripping step, the solid particles are maintained in a dilute condition or as a dilute suspension of solid particles in stripping gas rather than in the dense phase or condition.

This is the preferred form of my invention but under some conditions dense phase stripping in the vessel 52 may be carried out. In the preferred or dilute phase stripping and when using powdered silica-alumina catalysts and using steam as the stripping agent, the density in the dilute phase will be about 4 lbs./cu.ft. to 10 lbs./cu. ft., which is dependent on the volume of stripping gas necessary to give the degree of stripping desired. When using steam or other gases as the stripping medium, the stripping gas should be at a temperature of about 900° F. to 1000° F. in catalytic cracking of hydrocarbons.

The stripped solid particles in a dense fluidized condition are withdrawn from the bottom of the stripping vessel or section 52 and flowed into a standpipe 86 provided with a control valve 88 which may be a slide valve for controlling the rate of withdrawal of the catalyst particles from the vessel 52. Aerating or fluidizing lines may be provided for standpipe 86. The particles are then passed through line 92 and mixed with a gas introduced through line 94 and the mixture passed through line 96 to a regenerator or regeneration zone (not shown) for removing coke or carbonaceous material from the solid particles. Where the regeneration is a burning step, the gas introduced through line 94 is preferably air.

The regenerator is similar in operation to that of reaction vessel 10 in that the catalyst particles are maintained in a dense fluidized condition therein and catalyst particles in a dense fluidized condition are withdrawn from the lower portion thereof and passed through line or standpipe 13 to line 12. The hydrostatic pressure built up by the fluidized mixtures is sufficient to cause the catalyst to circulate through the system. The regenerator is preferably a somewhat higher level than the reactor.

The stripping gas containing the material which was stripped out of the catalyst or contact particles and also containing entrained particles leaves the top of the stripping section or vessel 52 through line 98 and may be introduced into the upper portion of the reaction vessel 10 above the dense phase 18 through valved line 102 wherein solids are separated from the gas by the decrease in velocity, or into the separating means 28 through valved line 104, or into the outlet line 32 from the separating means 28 through valved line 106. According to my invention, the stripping gas and the volatile material stripped out of the catalyst do not pass through the dense fluidized bed 18 and therefore more vaporous reactants may be passed through the bed 18 in the reaction vessel 10 without excessive entrainment of catalyst to the separating means 28.

Instead of passing to lines 102, 104 and 106, the stripping gas leaving the top of the stripping vessel 52 through line 98 may be passed through line 99 to a separate separating means and the recovered catalyst returned to the top, intermediate or bottom portion of the stripping vessel 52 or to line 96 leading to the regenerator. In this way, the spent catalyst would not be recycled to the reactor 10 where it would reduce the average catalyst activity. The stripping gas and stripped material may be withdrawn through line 99 and the stripped volatile material separately recovered.

In as much as 2 to 6 lbs. of steam per 1000 lbs. of catalyst, or a molar equivalent of such other stripping gas as may be used, are required to give satisfactory stripping, it is apparent that if this stripping gas is allowed to go into the reactor, it will represent from 5 to 55 mol per cent of the vapors in the reactor as the ratio of catalyst/oil varies from 5 to 35 weight of catalyst per weight of oil. Common practice when using the annular type stripper shows about 33 mol per cent of the vapors in the reactor to be due to the stripping gas. It is therefore apparent that by-passing the stripping gas in line 98 around the dense fluidized bed 18 in the reactor is a definite advantage and improvement.

In the catalytic cracking of hydrocarbons, such as gas oil to make gasoline or aviation gasoline, the temperature in the reaction vessel 10 is about 850° F. to 1025° F. The regenerated catalyst is returned through line 12 at a temperature of about 1050° F. to 1150° F.

With my invention it will be also seen that in cases where it is desirable to run the stripping section 52 at velocities of about 2 to 3 ft./second, the stripping steam will contain larger amounts of entrained particles and in such a case, it is advantageous to introduce the stripping gas through line 102 into the dilute phase 24 in the reaction vessel 10 to take advantage of the lower velocity settling zone and permit settling out of a large amount of the entrained solid particles. Under normal conditions, the velocity of the stripping steam passing through the stripping section 52 will be about 0.5 ft./second to 1.0 ft./second.

While I have shown one form of apparatus and have given certain operating conditions, it is to be understood that these are by way of illustration only and various changes and modifications may be made without departing from the spirit of my invention.

What is claimed is:

An apparatus of the character described including a vertically arranged elongated vessel, means for introducing a gaseous fluid and subdivided solids into the lower portion of said vessel, said means including a horizontally extending perforated distribution plate arranged in the lower portion of said vessel, means for withdrawing gaseous fluid and entrained solids from the upper portion of said vessel, means for withdrawing solids and gaseous fluid from the bottom portion of said vessel below said distribution plate, means associated with said gaseous fluid and entrained solids withdrawal means for separating entrained solids from the gaseous fluid and returning the solids to said vessel below said distribution plate, and means for segregating gaseous fluid from the solids withdrawn from said bottom portion and for preventing further contact of the fluid thus segregated with the solids in the bottom portion in said vessel, said segregating means comprising a separate stripping vessel communicating at its top with the means for withdrawing solids from said first mentioned vessel and provided with an inlet for a stripping gas, said stripping vessel being further provided with baffles, a bottom outlet on said stripping vessel to remove stripped solids and a top outlet on said stripping vessel for removing stripping gas and volatile material.

WILFRED O. TAFF.

REFERENCES CITED

The following references are of record in the file of this patent:

UNITED STATES PATENTS

| Number | Name | Date |
|---|---|---|
| 2,253,486 | Belchetz | Aug. 19, 1941 |
| 2,302,209 | Goddin | Nov. 17, 1942 |
| 2,326,705 | Thiele et al. | Aug. 10, 1943 |
| 2,327,175 | Conn | Aug. 17, 1943 |
| 2,341,193 | Scheineman | Feb. 8, 1944 |
| 2,345,718 | Walton | Apr. 4, 1944 |
| 2,353,731 | Kanhofer | July 18, 1944 |
| 2,355,016 | Stein | Aug. 1, 1944 |
| 2,366,372 | Voorhees | Jan. 2, 1945 |
| 2,367,694 | Snuggs | Jan. 23, 1945 |
| 2,377,512 | Page | June 5, 1945 |
| 2,385,446 | Jewell et al. | Sept. 25, 1945 |
| 2,394,814 | Snuggs II | Feb. 12, 1946 |

FOREIGN PATENTS

| Number | Country | Date |
|---|---|---|
| 118,399 | Australia | Apr. 12, 1944 |